United States Patent
Carlson

(10) Patent No.: US 9,097,813 B2
(45) Date of Patent: Aug. 4, 2015

(54) APPARATUS AND METHOD FOR SENSING A PIPE COUPLER WITHIN AN OIL WELL STRUCTURE

(75) Inventor: Aaron Mitchell Carlson, Lake Country (CA)

(73) Assignee: Intelligent Spools Inc., Red Deer, Alberta (CA)

( * ) Notice: Subject to any disclaimer, the term of this patent is extended or adjusted under 35 U.S.C. 154(b) by 399 days.

(21) Appl. No.: 13/593,493

(22) Filed: Aug. 23, 2012

(65) Prior Publication Data

US 2014/0055141 A1    Feb. 27, 2014

(51) Int. Cl.
*G01V 3/08* (2006.01)
*E21B 47/09* (2012.01)

(52) U.S. Cl.
CPC .............. *G01V 3/08* (2013.01); *E21B 47/0905* (2013.01)

(58) Field of Classification Search
CPC .... G01R 31/025; G01R 31/08; G01R 31/088; G01R 31/085; G01R 31/024; G01R 31/026; G01R 31/041; G01R 27/2611; B60R 21/015; B60R 2021/01088; B60R 21/01184; B60R 21/0157; H02H 1/0015; H02H 3/33; H02H 3/335; H02H 3/338; H02H 3/105; H02H 3/347; H01H 83/04
USPC ......... 324/326, 522, 520, 511, 512, 521, 509, 324/86, 107, 108, 555; 361/42; 702/58, 59
See application file for complete search history.

(56) References Cited

U.S. PATENT DOCUMENTS

| 3,103,976 | A | * | 9/1963 | De Vries Douwe et al. .. 166/336 |
| 4,710,712 | A | | 12/1987 | Bradfield et al. |
| 4,862,426 | A | * | 8/1989 | Cassity et al. ................... 367/81 |
| 4,922,423 | A | * | 5/1990 | Koomey et al. ................. 702/39 |
| 5,321,990 | A | * | 6/1994 | Lang et al. ................. 73/861.24 |
| 5,666,050 | A | * | 9/1997 | Bouldin et al. .......... 324/207.26 |
| 6,478,087 | B2 | * | 11/2002 | Allen .......................... 166/255.1 |
| 6,815,945 | B2 | * | 11/2004 | Biester et al. ............. 324/207.24 |
| 7,249,891 | B2 | * | 7/2007 | Aoki et al. ..................... 384/448 |
| 7,559,255 | B2 | * | 7/2009 | Munz et al. ...................... 73/856 |
| 8,544,538 | B2 | * | 10/2013 | Weir et al. ..................... 166/85.4 |
| 2004/0041560 | A1 | | 3/2004 | Walters et al. |
| 2005/0055163 | A1 | * | 3/2005 | Hopper ............................. 702/6 |
| 2011/0057647 | A1 | | 3/2011 | Biester et al. |

OTHER PUBLICATIONS

International Search Report from PCT/CA2013/050658 mailed on Nov. 1, 2013.

* cited by examiner

*Primary Examiner* — Tung X Nguyen
*Assistant Examiner* — Thang Le
(74) *Attorney, Agent, or Firm* — Richard D. Okimaw

(57) ABSTRACT

A system for sensing a pipe joint within a well structure bore comprises a body connectable in line with the well structure. The body has a central bore therethrough and includes a plurality of blind bores extending radially inwards from the outer surface. The system further includes at least one sleeve being locatable within one of the plurality of blind bores wherein each of the sleeves has a magnet located at an end thereof at least one sensor being locatable within one of the at least one sleeves. The at least one sensor is operable to output a signal representing the width of a metallic object located within the central bore. The system may further include a display operable to receive the output signal from the at least one sensor and to display an output to a user indicating the width of the metallic object within the central bore.

15 Claims, 6 Drawing Sheets

APPARATUS AND METHOD FOR SENSING A PIPE COUPLER WITHIN AN OIL WELL STRUCTURE

BACKGROUND OF THE INVENTION

1. Field of Invention

The present invention relates to well boring in general and in particular to a method and apparatus for sensing a pipe joint within a well structure.

2. Description of Related Art

In hydrocarbon production, a well may be formed by an outer casing located within a wellbore and may optionally be surrounded by cement. The well may then include a tool or production string therein for working or producing from the well. Due to the potentially high pressures within the well from hydrocarbons extracted from the hydrocarbon producing formation, numerous types of shut-off valves, spools and other fittings to isolate and control access to the well, such as, by way of non-limiting example a Christmas tree, as it is commonly known or a snubbing rig.

The well structure may include shut-off valves for closing off or otherwise completely or partially sealing the top of the well as desired by a user. In particular, one common design for such valves are pipe rams which utilize a pair of opposed rams which are movable along a plane perpendicular to the well bore. The rams may be moved along the plate by pistons or the like and are operable to be moved out of the central passage of the well or to be pressed together to seal the well. Rams may be of a blind or shear type to completely seal the well or of a pipe ram type in which the two rams each include a half-circle hole sized to pass a pipe therethrough when the two rams are pressed together. Such pipe rams are commonly utilized in snubbing rigs to seal around the drill or production string and isolate the well below the pipe ram from the environment while permitting the drill or production string to remain within the well or to be extracted or inserted into the well.

One difficulty that exists with common hydrocarbon wells is the difficulty of determining the location of the joints on the tool or production string. Such strings are commonly formed of a plurality of endwise connected pipes which are connected to each other by threaded connectors. Conventionally such threaded connectors are located at each end and provide enlarged portions of the pipe which are strengthened so as to provide a larger stronger section of the pipe to be grasped by tools and the like. Such tool joints present a larger cross-section than the remainder of the pipe. Disadvantageously, such enlarged diameters of tool joints may interfere with the proper operation of pipe rams should the pipe ram be attempted to be closed at the location of such a tool joint or when extracting or inserting the pipe when at least one of the rams is set to hold back the pressure. Such an event is commonly referred to as stripping which may create a risk of the tool joint being pulled or pushed into the closed piper ram thereby damaging the pipe and/or pipe ram.

SUMMARY OF THE INVENTION

According to a first embodiment of the present invention there is disclosed a system for sensing a pipe joint within a well structure bore. The system comprises a body connectable in line with the well structure. The body has a central bore therethrough along a central axis corresponding to a central bore of the well structure and an outer surface. The body includes a plurality of blind bores extending radially inwards from the outer surface. The system further includes at least one sleeve being locatable within one of the plurality of blind bores wherein each of the sleeves has a magnet located at an end thereof at least one sensor being locatable within one of the at least one sleeves. The at least one sensor is operable to output a signal representing the width of a metallic object located within the central bore.

The at least one sleeve may be formed of a ferromagnetic material. The body may comprise a spool. The spool may include a plurality of connection bores extending through the spool parallel to the central axis. The blind bores may be located between the connection bores. The spool may be formed of a substantially non-magnetic alloy. The spool may be formed of a nickel-chromium based alloy.

Each of the at least one sensors may comprise a hall effects sensor. At least one pair of blind bores may be connected to each other by a bridging bar. A first pair the blind bores may be located on opposite sides of the body. A second pair of blind bores may be located to one side of the first pair. The bridging bar may comprise a tubular member extending between the sleeves of the at least one pair of blind bores. The bridging bar may comprise a solid member extending between the sleeves of the at least one pair of blind bores. The bridging bar may be formed of a ferromagnetic material.

The system may further comprise a display operable to receive the output signal from the at least one sensor and to display an output to a user indicating the width of the metallic object within the central bore.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
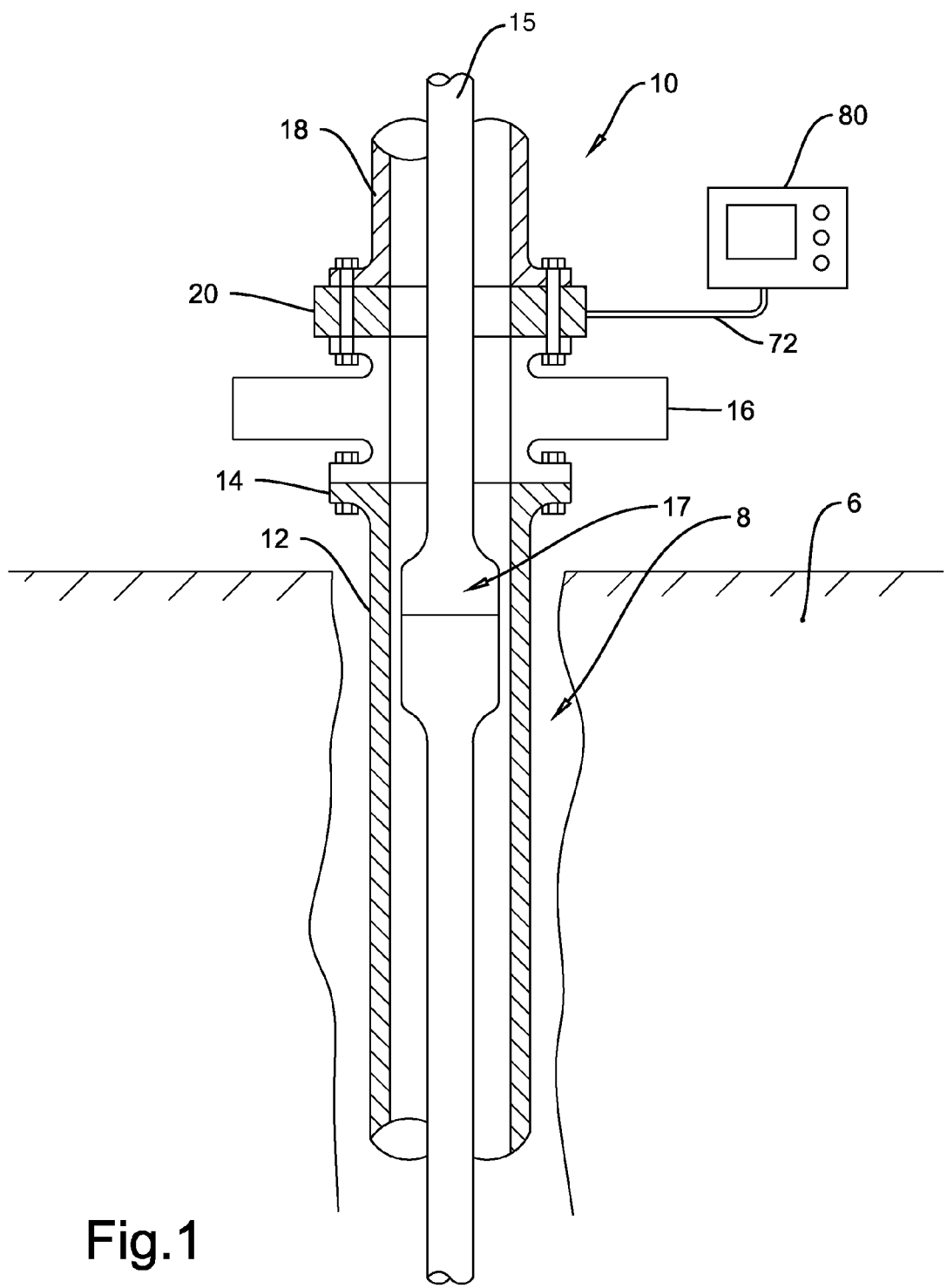
FIG. 1 is a cross-sectional view of a the top end of a wellbore having an outer casing and a production string located therein with an apparatus for sensing the location of a pipe joint.

Referring to FIG. 1, a well assembly located within a well bore 8 of a soil formation 6 is illustrated generally at 10. The well assembly includes a well casing 12 having top flange 14 which is securable to a pipe ram 16 or any other desired well head device. It will be appreciated that the present apparatus may be located at any location within the well, such as, by way of non-limiting example, the casing, snubbing unit, blow out preventer or any other well apparatus. It will also be appreciated that the Although only a single pipe ram is illustrated in FIG. 1 for the sake of clarity, it will be appreciated that many installations will include more than one well head component. As illustrated in FIG. 1, the well assembly includes an apparatus for sensing a pipe joint according to a first embodiment of the invention, shown generally at 20 and one or more top pipe, well component or other equipment 18 located thereabove. A production or tool string 15 is located within the casing and includes a plurality of tool joints 17 therealong.

The apparatus 20 senses the presence of the tool joint 17 and outputs a signal to a display 80 so as to indicate to a user that the tool joint 17 located within apparatus 20 so as to permit the user to advance the production or tool string 15 within the casing 12 by a predetermined distance so as to avoid having one of the pipe rams 16 or other well head devices engage upon the tool joint.

Figure 2:
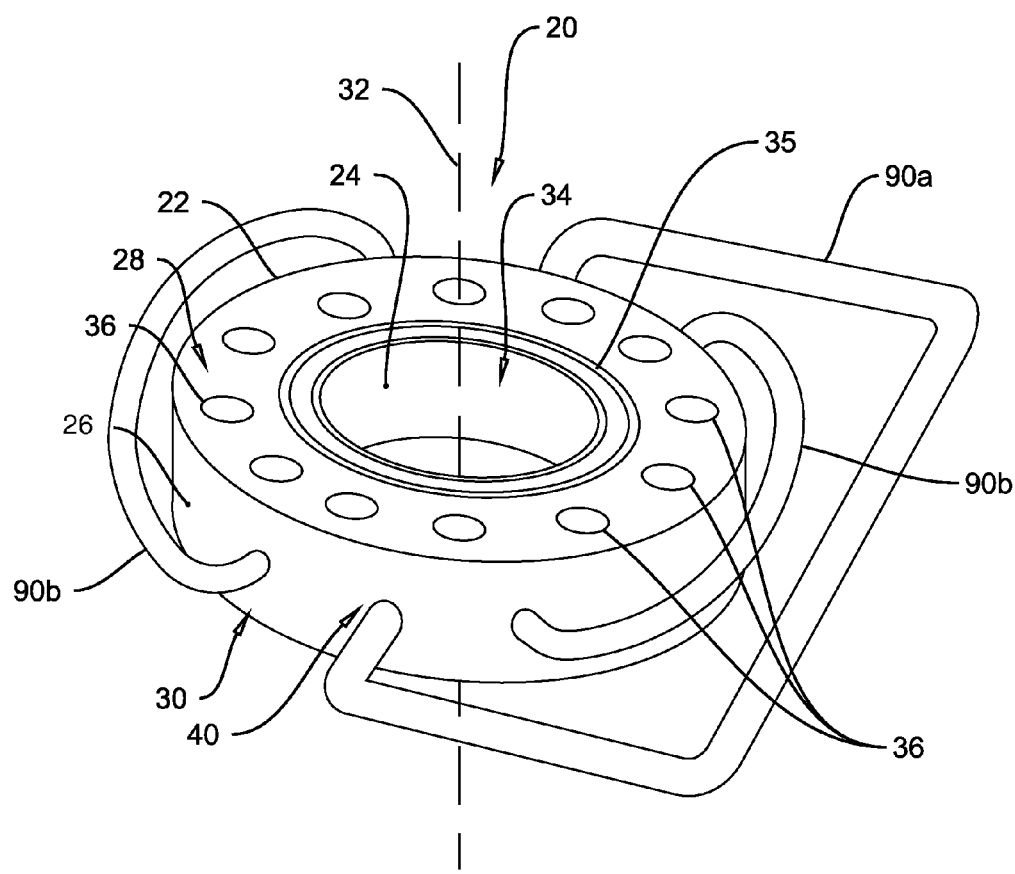
FIG. 2 is a perspective view of the apparatus for sensing the location of a pipe joint according to a first embodiment of the present invention.
Figure 4:
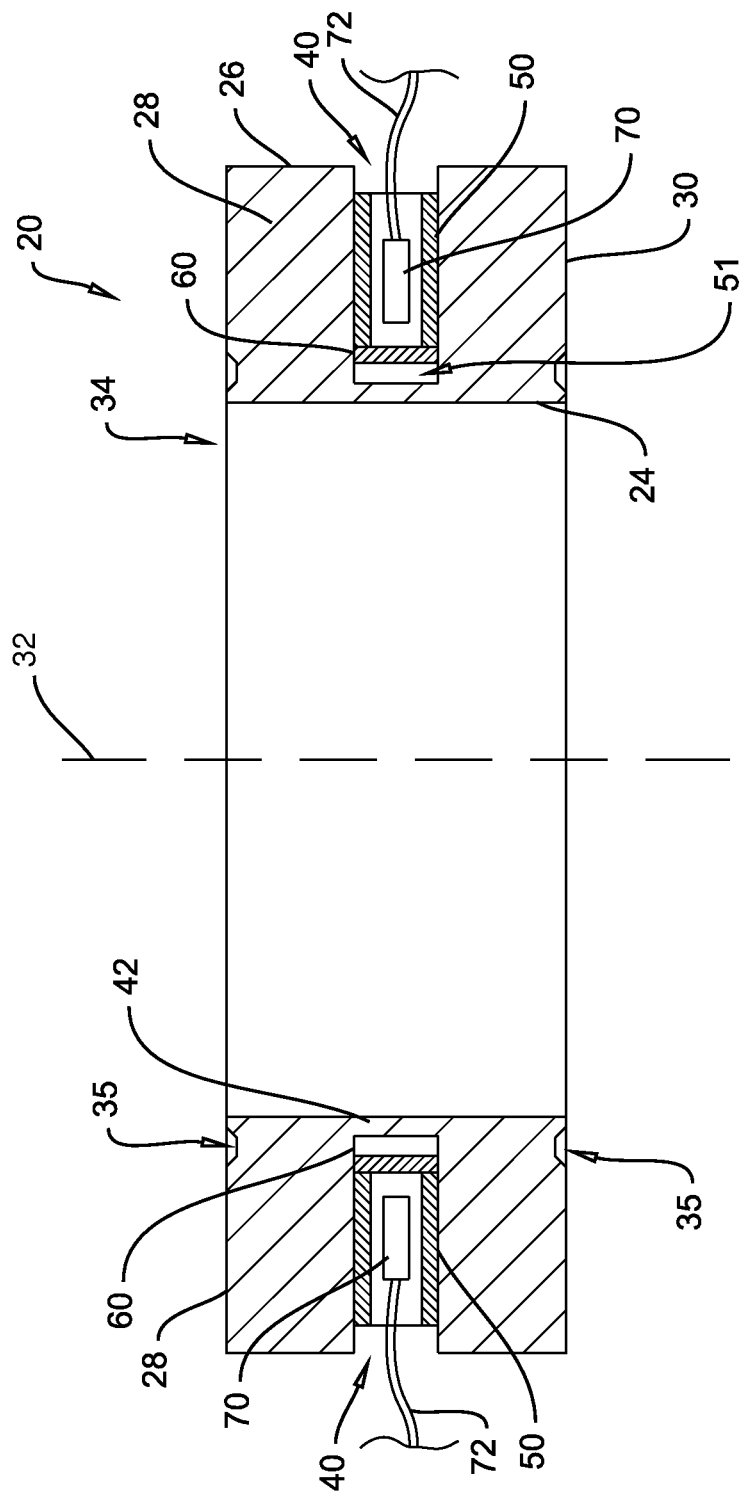
FIG. 4 is a cross-sectional view of the apparatus of FIG. 3 as taken along the line 4-4.

With reference to FIG. 2, the apparatus 20 comprises a body 22 having a plurality of sensor bores 40 therein each adapted to receive a sleeve and a sensor therein. The body 22 comprises an annular or ring-shaped spool having inner and outer surfaces, 24 and 26, respectively and extending between top and bottom surfaces, 28 and 30, respectively. As illustrated in FIG. 1, the inner and outer surfaces 24 and 26 are substantially cylindrical about a central axis 32 of the spool 22. The inner surface 24 defines a central passage 34 extending therethrough which may be sized and shaped to correspond to the interior of the casing 12. As illustrated in FIGS. 2 and 4, the top and bottom surfaces are substantially planar along a plane normal to the axis 32 and may optionally include a seal groove 35 extending annularly therearound for receiving a seal as are commonly known in the art.

The spool 22 includes a plurality of bolt holes 36 extending therethrough between the top and bottom surfaces 28 and 30 along axis parallel to the central axis 32. The bolt holes 36 are utilized to pass fasteners, such as bolts 38 as illustrated in FIG. 1 therethrough to secure the spool inline to the other components of the well assembly 10 according to known methods in the art.

Figure 5:
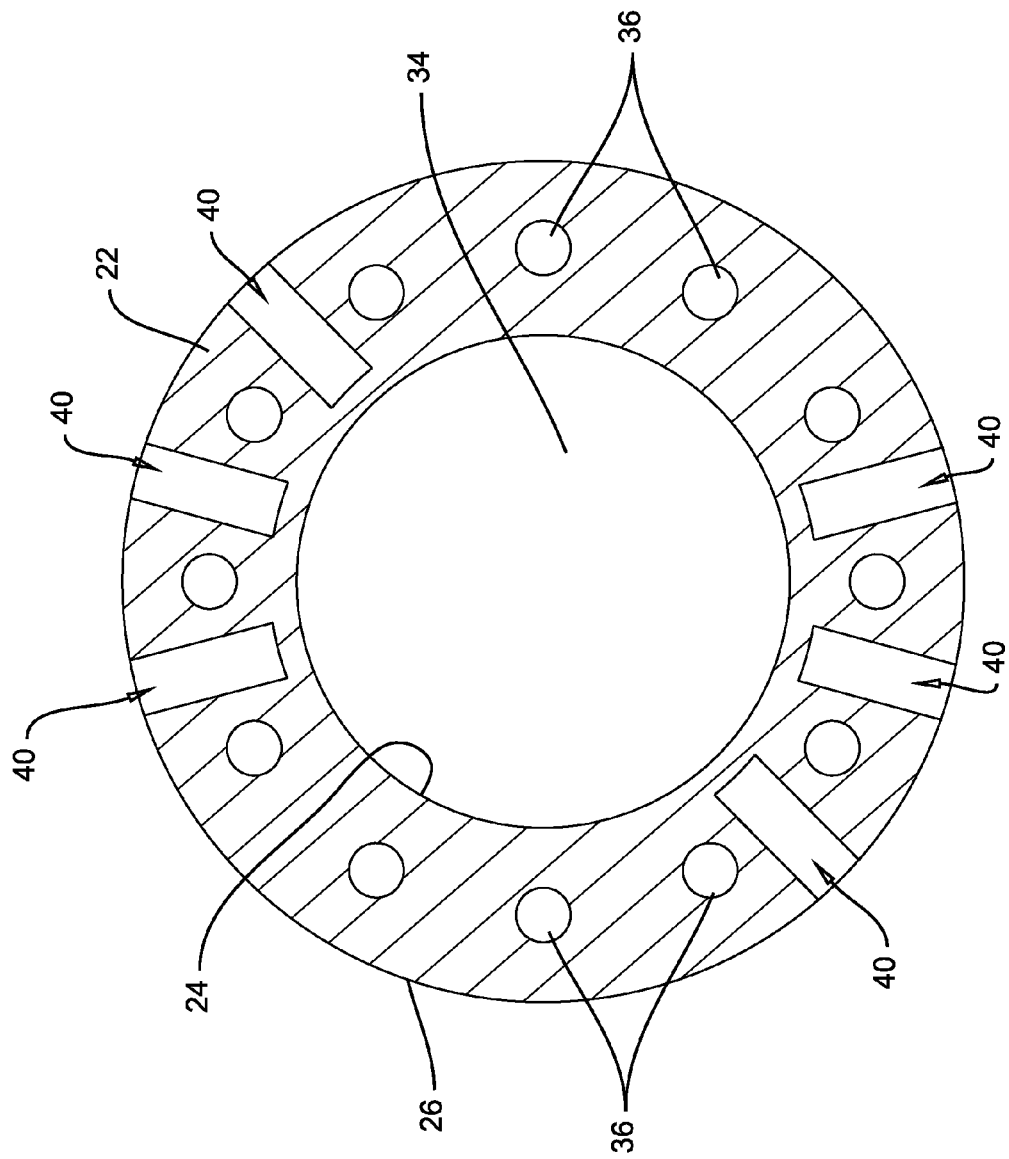
FIG. 5 is a cross-sectional view of the apparatus of FIG. 3 as taken along the line 5-5.

The spool 22 also includes sensor bores 40 extending thereinto from the outer surface 26. As illustrated herein, the sensor bores 40 are blind bores extending to a bottom depth within the spool by a distance less than the distance from the outer surface 26 to the inner surface 24. In such a manner, the sensor bore 40 will maintain a barrier wall, generally indicated at 42 in FIG. 4 between the sensor bore 40 and the central passage 34 so as to maintain the seal provided by the spool 22. The barrier wall 42 may have a thickness selected to provide adequate burst strength of the spool according to known methods. Optionally the sensor bore 40 may extend completely through the spool to the inner surface 24. With reference to FIG. 5, the bolt bores 36 may be located at regular intervals around the spool wherein the sensor bores extend through the spool at locations between the bolt bores. As illustrated in FIG. 5, the sensor bores 40 may be arranged about the central passage 34 along a common plane normal to the axis 32 of the central passage although other orientations may be useful as well.

The spool 22 may have any depth between the top and bottom surfaces 28 and 30 as is necessary to accommodate the sensor bores 40. By way of non-limiting example the spool may have a depth of between 3.5 and 24 inches (89 and 610 mm) with a depth of approximately 4 inches (102 mm) having been found to be particularly useful. Additionally, the spool will be selected to have an inner diameter of the inner surface 24 to correspond to the inner passage of the casing 12 for which it is to be used and an outer surface 26 diameter so as to provide a sufficient depth for the sensor bores 40. In practice it has been found that an outer diameter of between 4 and 12 inches (102 and 305 mm) larger than the inner diameter has been useful. The spool 22 may be formed of a non-magnetic material, such as, by way of non-limiting example a nickel-chromium based alloy, such as Inconel® manufactured by Special Metals Corporation. It will also be appreciated that other materials may be useful as well, such as, by way of non-limiting example duplex and super duplex stainless steels provided they do not interfere with the sensor operation as described below.

Figure 3:
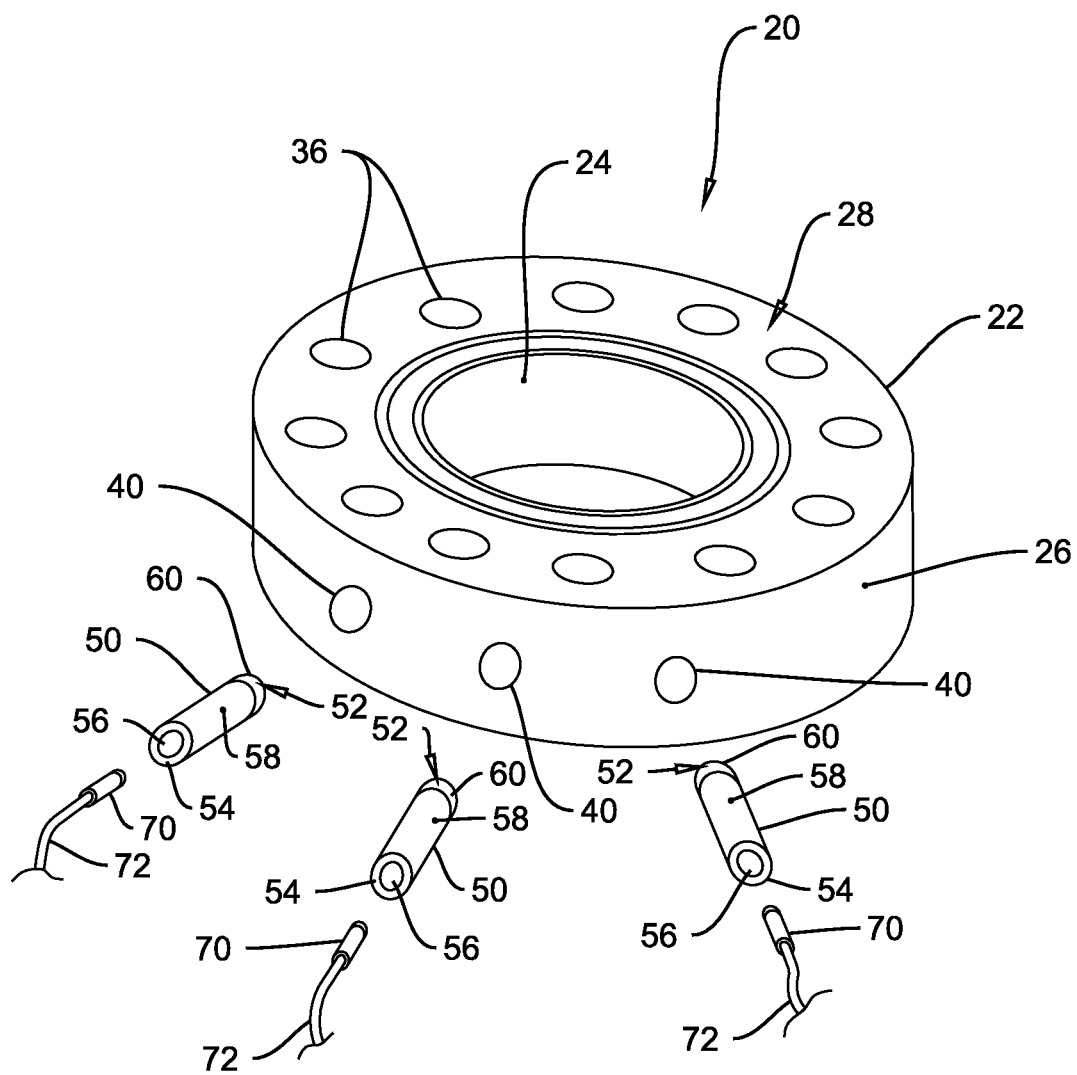
FIG. 3 is an exploded view of an apparatus for sensing the location of a pipe joint according to a first embodiment of the present invention.

With reference to FIG. 3, an exploded view of the apparatus is illustrated having sleeves 50 locatable within each of the sensor bores and sensors 70 locatable within the sleeves 50. The sleeves 50 comprise tubular members extending between first and second ends, 52 and 54, respectively, and having inner and outer surfaces, 56 and 58, respectively. As illustrated in FIG. 4, the outer surface 58 of the sleeves are selected to correspond closely to the sensor bores 40 in the spool 22. The sleeves 50 are formed of a substantially ferromagnetic material, such as steel so as to conduct magnetic flux as will be more fully described below. The sleeves 50 are selected to have a sufficient outer diameter be received within the sensor bores 40 and an inner surface diameter sufficient to accommodate a sensor 70 therein. By way of non-limiting example it has been found that a diameter of the inner surface of between 0.5 and 1 inches (13 and 25 mm) has been useful. The sleeve 50 may also have a length sufficient to receive the sensor 70 therein, such as by way of non-limiting example, between 0.5 and 3 inches (13 and 76 mm). The outer diameter of the sleeve 50 may also optionally be selected to permit the sleeve to be secured within the sensor bore by means of an interference fit or with the use of adhesives, fasteners, plugs or the like. The sleeve 50 may also be selected to have an outer diameter of sufficient size to have an interference fit with the sensor bore 40.

The sleeves 50 also include a magnet 60 located at the first end 52 thereof. The magnets 60 are selected to have strong magnetic fields. In particular, it has been found that rare earth magnets, such as, by way of non-limiting example, neodymium, or samarium-cobalt. Optionally, the magnets 60 may also be nickel plated. The magnets 60 are located at the first ends 52 of the sleeves 50 and retained in place by the magnetic strength of the magnets. Optionally, the sleeve 50 may include an air gap 51 between the magnet 60 and the barrier wall 42 of up to ½ inch (13 mm) although other distances may be useful as well.

The sensors 70 are inserted into the open second ends 54 of the sleeves and are retained within the sleeves by any suitable means, such as, by way of non-limiting example, adhesives, threading, fasteners or the like. The sensors 70 are selected to provide an output signal in response to the magnetic field in their proximity. By way of non-limiting example, the sensors 70 may comprise magnetic sensors, such as hall effect sensors although it will be appreciated that other sensor types may be utilized as well. As illustrated in FIG. 4, the sensor may be located substantially at a midpoint of the sleeves 50 although it will be appreciated that other locations within the sleeve may be useful as well. The sensor includes an output wires 62 extending therefrom. The output wire 62 is wired or otherwise connected to the display and is therefore operable to provide an output signal representing the width of a metallic object located within the central passage 34 such as the drill string.

Figure 6:
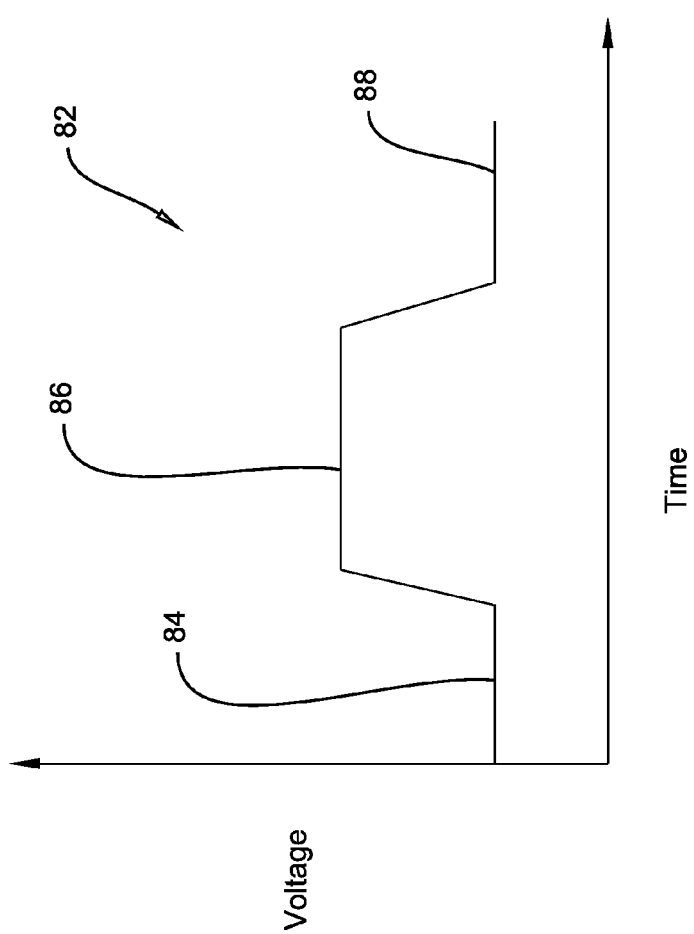
FIG. 6 is an illustration of a display output showing voltage produced by a sensor of the apparatus of FIG. 3 as a tool joint is passed therepast.

With reference to FIG. 6, the output 70 may display the voltage signal outputted by the one or more sensors against time. During a first time period, the voltage signal will be at a first level, generally indicated at 84, while a main portion of the pipe is drawn through the spool 22. As the tool joint 17 is drawn through the spool 22, the voltage output of the sensors 70 will be increased, generally indicated at 86, due to the increased diameter of the metallic object within the central passage 34. After the tool joint 17 passes the spool, the voltage will return to a lower level 88. In such a manner, the display 80 will indicate to an operator when the tool joint 17 is located within the sleeve. Thereafter, the operator will be able to advance the production or tool string 15 by a known distance so as to ensure that the pipe rams 16 or other equipment avoids the tool joint 17.

With reference to FIG. 2, the apparatus may be provided with a bridging bars 90 extending between a pair of opposed sleeves 50. The bridging bars 90 may be formed of a substantially ferromagnetic material and is adapted to be secured within the sensor bores 40. The bridging bars 90 may be solid or hollow and are operably connected to the sleeves 50 within the sensor bores 40. The bridging bars 90 serves to link the magnets and sensors on opposed sides of the spool 22 thereby increasing the field observed. As illustrated in FIG. 2, the apparatus may include a central bridging bar 90a extending between sensor bores 40 on opposed sides of the spool 22 and a pair of side bridging bars 90b extending between a pair of sensor bores 40 located to one side of the central bridging bar 90a. It will be appreciated that other arrangements may be useful as well, such as excluding the side or central bridging bars.

While specific embodiments of the invention have been described and illustrated, such embodiments should be considered illustrative of the invention only and not as limiting the invention as construed in accordance with the accompanying claims.

What is claimed is:

1. A system for sensing a pipe joint within a well structure, the system comprising:
    a body connectable in line with said well structure, said body having a central bore therethrough along a central axis corresponding to a central bore of said well structure and an outer surface, said body including a plurality of blind bores extending radially inwards from said outer surface, said body having a barrier wall extending between said blind bores and said central bore so as to isolate said blind bores from said central bore;
    at least one sleeve being locatable within one of said plurality of blind bores, each of said sleeves having a magnet located at an end thereof; and
    at least one sensor being locatable within said at least one sleeves, said at least one sensor being operable to output a signal representing the width of a metallic object located within said central bore.

2. The system of claim 1 wherein said at least one sleeve is formed of a ferromagnetic material.

3. The system of claim 1 wherein said body comprises a spool.

4. The system of claim 3 wherein said spool includes a plurality of connection bores extending through said spool parallel to said central axis.

5. The system of claim 4 wherein said blind bores are located between said connection bores.

6. The system of claim 3 wherein said spool is formed of a substantially non-magnetic alloy.

7. The system of claim 6 wherein said spool is formed of a nickel-chromium based alloy.

8. The system of claim 1 wherein each of said at least one sensors comprise a hall effects sensor.

9. The system of claim 8 wherein at least one pair of blind bores are connected to each other by a bridging bar.

10. The system of claim 9 wherein a first pair said blind bores are located on opposite sides of said body.

11. The system of claim 9 wherein a second pair of blind bores are located to one side of said first pair.

12. The system of claim 9 wherein said bridging bar comprises a tubular member extending between said sleeves of said at least one pair of blind bores.

13. The system of claim 9 wherein said bridging bar comprises a solid member extending between said sleeves of said at least one pair of blind bores.

14. The system of claim 9 wherein said bridging bar is formed of a ferromagnetic material.

15. The system of claim 1 further comprising a display operable to receive said output signal from said at least one sensor and to display an output to a user indicating the width of said metallic object within said central bore.

* * * * *